United States Patent [19]

Dorion et al.

[11] Patent Number: 5,038,043

[45] Date of Patent: Aug. 6, 1991

[54] HIGH RESOLUTION METHOD AND APPARATUS FOR LOCALIZING NEUTRAL PARTICLES

[75] Inventors: Irène Dorion, Paris; Mario Ruscev, Issy les Moulineaux; Serge Maitrejean, Paris, all of France

[73] Assignee: Schlumberger Industries, Montrouge, France

[21] Appl. No.: 426,389

[22] Filed: Oct. 25, 1989

[30] Foreign Application Priority Data

Oct. 28, 1988 [FR] France .................. 88 14185

[51] Int. Cl.$^5$ .................................. G01T 1/185
[52] U.S. Cl. ...................... 250/374; 250/385.1
[58] Field of Search ................ 250/385.1, 374

[56] References Cited

U.S. PATENT DOCUMENTS

| 3,971,942 | 7/1976 | Seidman et al. ........... 250/369 |
| 4,055,762 | 10/1977 | Allemand ................. 250/385.1 |
| 4,816,683 | 3/1989 | Marsden ................. 250/385.1 |

FOREIGN PATENT DOCUMENTS 0000271 1/1979 European Pat. Off. .
0228933 7/1987 European Pat. Off. .

OTHER PUBLICATIONS

CRC Handbook of Chemistry & Physics, 55th Edition, 1974-5 Weast, pp. C-765 & F-159.
Nuclear Instruments & Methods, vol. 156, No. 1, Oct. 1978, pp. 27-31, North-Holland Publishing Co., Amsterdam, NL; J. E. Bateman et al.

Primary Examiner—Carolyn E. Fields
Assistant Examiner—Drew A. Dunn
Attorney, Agent, or Firm—Sanford J. Asman

[57] ABSTRACT

The invention relates to a neutral particle detector for providing one-dimensional analysis of a flux (14) of neutral particles which reach it in a sheet. The detector comprises a solid plane converter (17) disposed at a grazing incidence, a grid of charge amplifying wires (18) making use of stimulated ionization of a gas, and charge collecting tracks (19). The tracks are disposed in the immediate proximity of the converter and are subjected to the same electrical potential as the converter. The invention is applicable to imaging.

24 Claims, 3 Drawing Sheets

HIGH RESOLUTION METHOD AND APPARATUS FOR LOCALIZING NEUTRAL PARTICLES

The present invention relates in particular to an apparatus for detecting and localizing particles in a flux of neutral particles emitted by a source and propagating within a solid angle of limited aperture defined about a mean direction, the apparatus comprising:
- a substantially plane solid converter for disposing at grazing incidence relative to said mean direction, said converter being suitable for producing electrical charges under the impact of said neutral particles;
- charge amplification means for raising the charges to an electrical potential different from that of the converter and for amplifying the charges by stimulated ionization of a surrounding gas;
- charge collecting means comprising elongate conductors which are electrically insulated from one another, which are substantially parallel to one another and to the converter, and each of which forms, together with the mean direction of said flux, a plane substantially perpendicular to the converter; and
- an enclosure which is permeable to the neutral particles and which contains the converter, the charge amplification means, the charge collecting means, and the gas.

Apparatus of this type is described in the European patent application published under the number 0,228,933.

This prior apparatus enables very high quality images to be obtained of objects which are large in size and high in density, and which are irradiated by a source of neutral particles such as X-ray photons, gamma ray photons, or neutrons, said objects being disposed between the source and the apparatus and being scanned.

In particular, this prior apparatus has made it possible to obtain images of irradiated objects with a previously unobtainable level of contrast.

The exceptional interest in this prior apparatus and shown by persons skilled in the art of image making has lead to a search for optimization in order to impart decisive qualities to this prior apparatus compared with other known systems, not only when making images of objects which are very voluminous and dense, but also when imaging objects which are smaller in size, which application is already possible with the prior apparatus even though in this application, it suffers from resolution limitations which are more severe than those of conventional systems.

The present invention was made in this context with this purpose, and it provides the additional benefit that the improvement made to the prior apparatus is applicable to all applications thereof.

The present invention provides apparatus for detecting and localizing particles in a flux of neutral particles emitted by a source and propagating within a solid angle of limited aperture defined about a mean direction, the apparatus comprising in conventional manner:
- a substantially plane solid converter for disposing at grazing incidence relative to said mean direction, said converter being suitable for producing electrical charges under the impact of said neutral particles;
- charge amplification means for raising the charges to an electrical potential different from that of the converter and for amplifying the charges by stimulated ionization of a surrounding gas;
- charge collecting means comprising elongate conductors which are electrically insulated from one another, which are substantially parallel to one another and to the converter, and each of which forms, together with the mean direction of said flux, a plane substantially perpendicular to the converter; and
- an enclosure which is permeable to the neutral particles and which contains the converter, the charge amplification means, the charge collecting means, and the gas;
- the apparatus being essentially characterized in that said charge amplification means comprise electrically conductive lines which are distinct from said charge collecting conductors, and in that the charge collecting conductors are intended to be connected to an electrical potential close to that of the converter.

The term "electrical potential close to that of the converter" is used herein to designate an electrical potential which may be identical to that of the converter but which is in any case closer thereto than is the potential of the charge amplification means. Insofar as the charges which are amplified by stimulated ionization are negative, the collected charges are positive, such that the charge collecting conductors act as cathodes.

Whereas the elongate charge collecting conductors in the prior apparatus also serve for charge amplification, in the apparatus of the present invention completely separate amplification means and charge amplification means are provided.

By separating the design constraints applicable firstly to the charge amplification means and secondly to the charge collecting means, this disposition makes it possible to avoid the compromises that limit the resolution of the prior system.

More precisely, when it was necessary to place the charge amplification means at a rather large potential relative to the converter in order to obtain a stimulated ionization phenomenon such as a Townsend avalanche, and to keep the charge amplifying conductor lines rather far apart from one another in order to ensure that the applied electric field was distributed in a manner compatible with the utilization of the amplification phenomenon, the constraint on the minimum distance between the lines had the direct consequence of limiting the resolution of the system since these lines were also used for collecting charges and their spacing determined the resolution of the system.

By getting rid of this constraint, thereby enabling the distance between charge collecting conductors to be reduced, the invention extends the resolution limit of the prior apparatus to limits imposed by technology.

In a particular embodiment of the apparatus of the invention, the charge collecting conductors are disposed in the immediate proximity of at least one of the faces of the converter and they are separated therefrom by a layer of insulating material.

In another embodiment, converter is built up from coplanar elements which constitute said charge collecting conductors.

Preferably, said charge amplification lines are disposed in at least one plane substantially parallel to the plane of the converter each extending substantially transversely relative to the direction in which the charge collecting conductors extend.

The term "substantially transversely" is used herein as a synonym for "not approximately parallel", in other words extending at an angle which is perpendicular or oblique, e.g. at an angle of not less than 20°.

When the apparatus is used for imaging objects of small volume, it is possible to bring the source of neutral particles closer to the apparatus, in which case it becomes advantageous for the charge collecting conductors, while remaining substantially parallel to one another, to be oriented in such a manner that their directions converge towards the source of neutral particles.

This particular disposition of the charge collecting conductors in which they are no longer exactly parallel to one another but are only approximately parallel makes it possible to move the source and the apparatus closer together while avoiding problems of parallax. By being closer together the number of particles reaching the apparatus is increased, thereby obtaining even better contrast in the resulting images. In addition, independently of the closer source, this disposition makes it possible to provide large-sized detectors which nevertheless do not suffer from parallax effects. In accordance with the invention this disposition is made very easy since the charge collecting conductors are independent of the charge amplifying lines so the disposition of these conductors can be chosen without giving rise to distribution problems in the avalanche-causing electric field.

In an industrial implementation of the apparatus of the invention, the insulating material preferably comprises a polymer sheet and said charge collecting conductors are constituted by copper tracks etched on said polymer sheet.

The invention also provides a method of detecting and localizing particles in a flux of neutral particles emitted by a source and propagating within a solid angle of limited aperture defined about a mean direction, the method comprising the following steps:
receiving said particles on a substantially plane solid converter disposed at grazing incidence relative to the mean direction of the flux of particles, thereby producing electrical charges from said neutral particles;
amplifying said charges by stimulated ionization of a surrounding gas; and
collecting the charges present in at least one plane substantially parallel to the converter at various locations spaced apart along a direction substantially parallel to the mean direction of the flux of particles;
the method being characterized in that the operation of collecting the charges consists in collecting charges of polarity opposite to the polarity of the charges which are amplified by ionization.

In a version of the method which is particularly suited to imaging, the charges are collected along charge collecting tracks which are spaced apart from one another along a direction which is substantially perpendicular to the mean direction of the flux of particles, and these tracks may converge towards the source of neutral particles.

Charge amplification comprises establishing at least one electrical potential different from that of the converter along a plurality of lines in a plane parallel to the converter, said lines preferably extending substantially transversely relative to the charge collecting tracks.

This disposition is particularly advantageous in that for each ionizing particle delivered from the converter, the charges generated by stimulated ionization may spread over two adjacent electric potential lines without the detected charges (i.e. the corresponding charges of opposite polarity collected on the tracks) needing to reach two different charge collecting tracks. Insofar as each track is disposed transversely to the lines, it corresponds to a plurality of lines. This disposition therefore also contributes to improving the resolution of the apparatus.

Other characteristics and advantages of the invention appear clearly from the following description given by way of non-limiting example and with reference to the accompanying drawings, in which.

Figure 1:
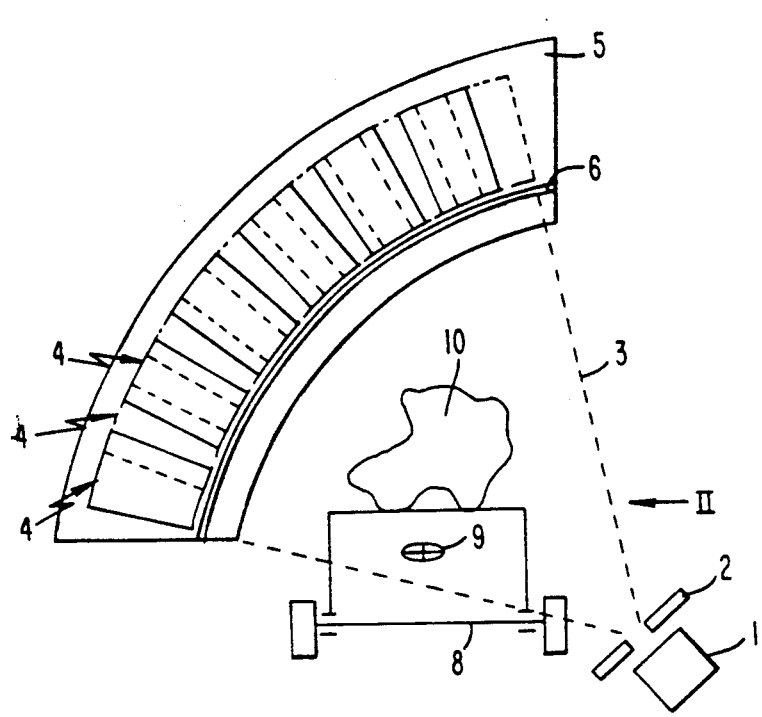
FIG. 1 is a diagrammatic front view of a system implementing the method of the invention.

In FIG. 1, reference 1 designates a source of neutral particles, e.g. of X-rays, of gamma ray photons, or of neutrons. In a typical application of the invention, the source 1 is an X-ray source whose energy lies in the range 250 keV to 750 keV.

The flux of particles emitted by the source is reduced by a first collimator 2 to an excitation beam 3 directed generally towards a set of detectors 4 carried by a frame 5.

One or more plates 6 of material which is opaque to the emitted neutral particles, e.g. lead when using X-rays, are disposed between the source 1 and the detectors 4 in the immediate proximity of the detectors, with the, or each, plate being provided with rectilinear slots 7, each of which constitutes a collimator specific to a corresponding detector 4.

Translation means represented by a carriage 8 suitable for moving along the direction indicated by arrow 9 are provided to move through the excitation beam 3, thereby serving to entrain an object 10 to be examined such that said object passes through the beam 3 while it is being moved in translation.

The collimation slots 7 extend perpendicularly to the translation direction indicated by arrow 9.

Figure 3:
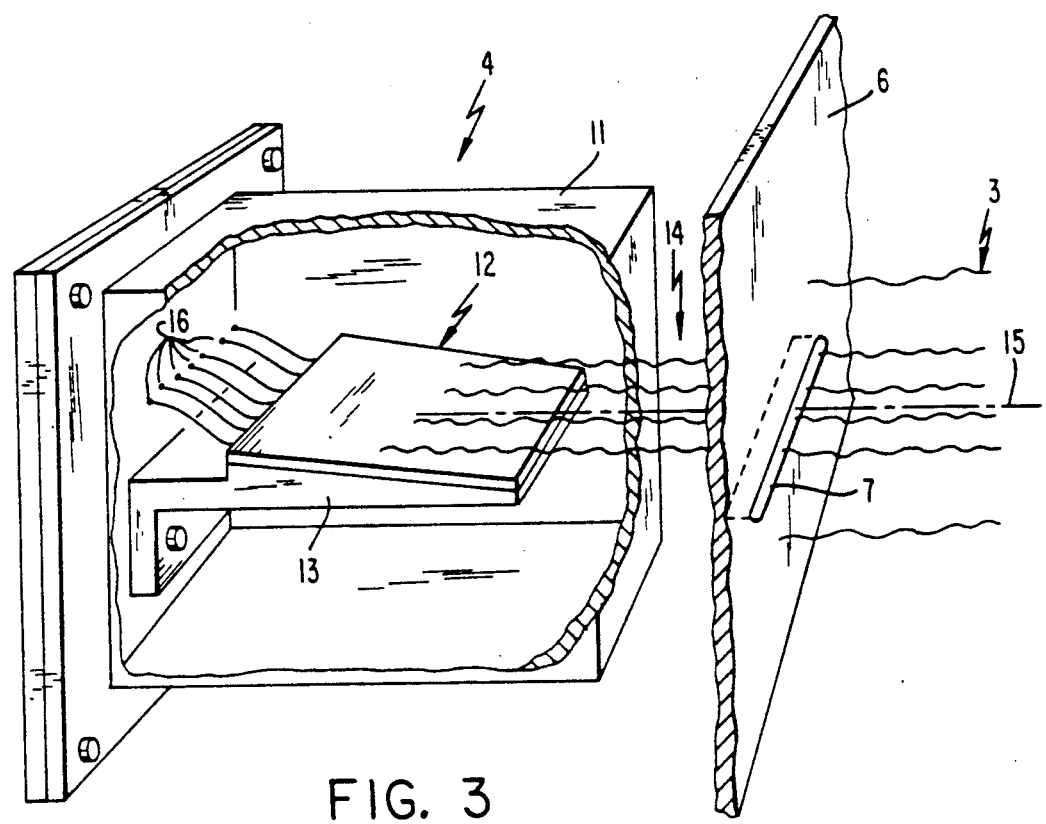
FIG. 3 is a perspective view of detection apparatus usable in the system of FIG. 1.

FIG. 3 shows one of the detectors 4 in greater detail.

This detector is suitable for constituting apparatus of the invention and comprises, in the same manner as already described in the above-mentioned published European patent application, a gas-containing enclosure 11 which is permeable to the neutral particles, and a detection assembly 12 supported by a bracket 13.

The gas may be constituted by any mixture of gases suitable for giving rise to charge amplification by stimulated ionization of the gas, e.g. by the appearance of the "Townsend avalanche" phenomenon, well known to the person skilled in the art. To this end, the gas may be a mixture comprising 70% argon and 30% ethane, with the ethane constituting a quencher substance. The pressure of the gas may be about one bar.

Figure 4:
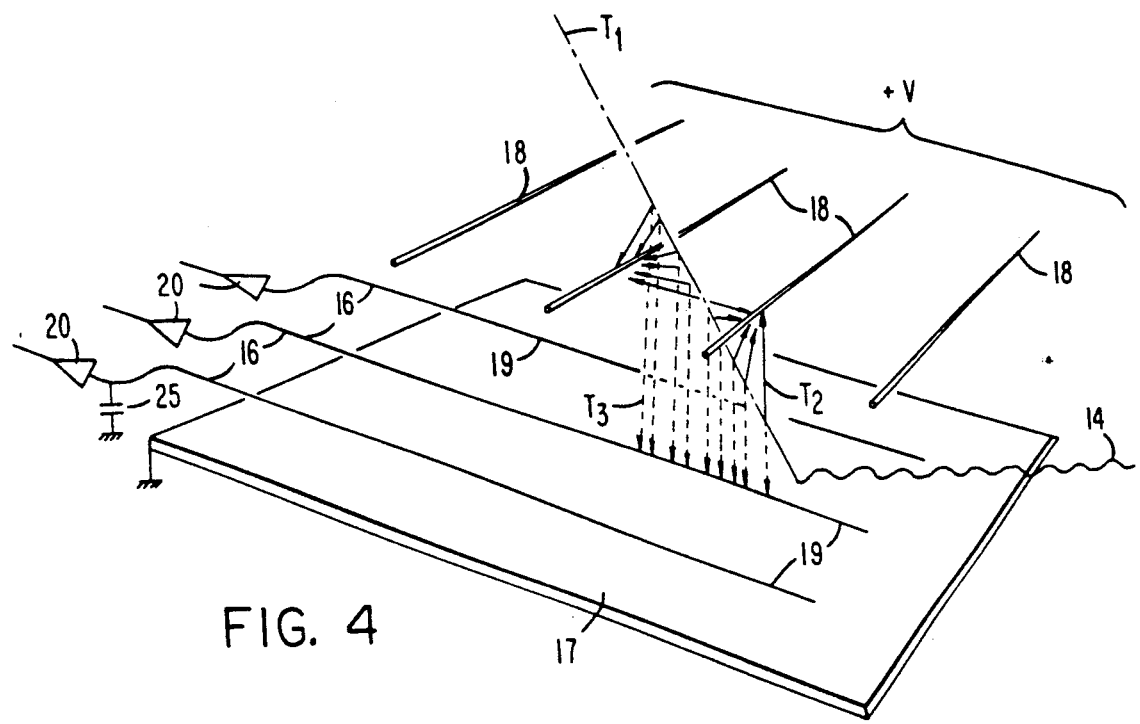
FIG. 4 is a theoretical diagram illustrating the method of the invention and the operation of a first embodiment of the FIG. 3 apparatus.
Figure 5:
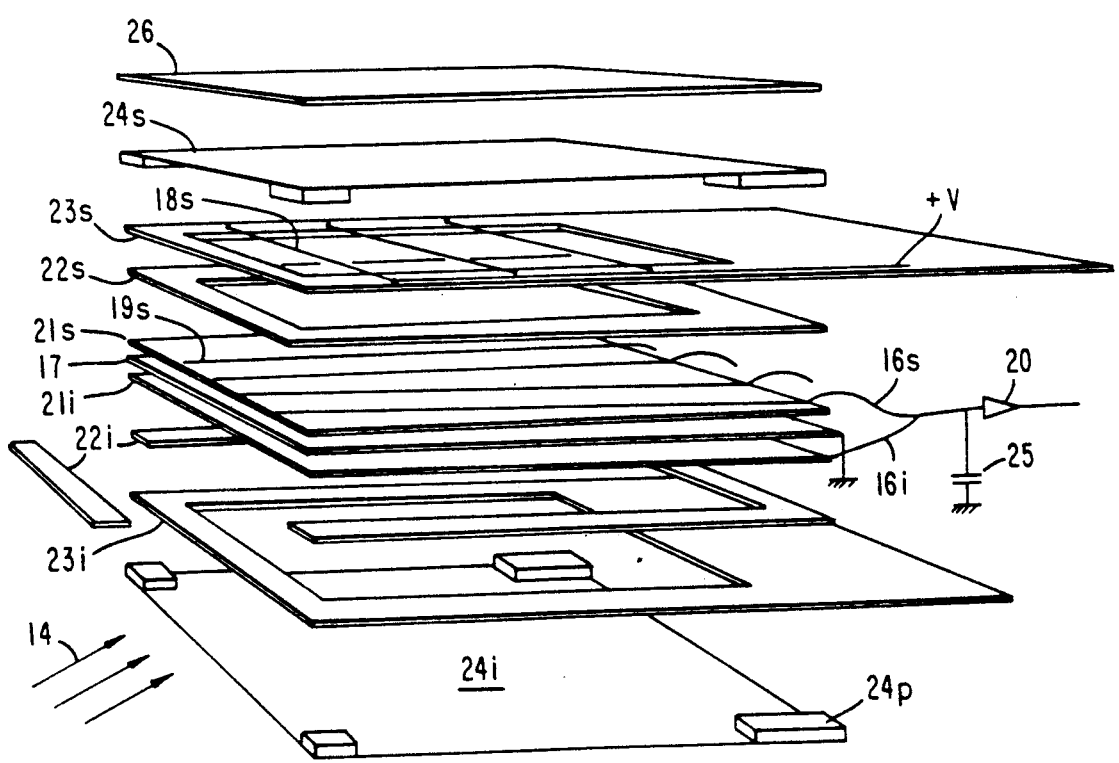
FIG. 5 is an exploded view of a detection subassembly from the FIG. 3 apparatus.

The detection assembly 12 which is described in greater detail with reference to FIGS. 4 and 5 is essentially planar in shape. It is supported by the bracket 13 so as to intercept the flux of neutral particles at a grazing incidence, which flux has passed through the object 10 and the collimator slot 7, and is propagating in the form of a plane sheet 14.

Both the detection assembly 12 and the sheet flux 14 are preferably perpendicular to the plane perpendicular to the rectilinear slot 7 of the corresponding slot collimator.

As shown in FIG. 3, the sheet flux 14 propagates within a solid angle whose aperture is delimited by the collimator slot 7, said solid angle extending around a mean direction 15 which corresponds to the trajectory of a particle passing through the center of the slot 7.

The sheet flux 14 which passes through a portion of the object 10 has a particle intensity distribution in a direction perpendicular to its direction of propagation which is representative of the nature and the thickness of the material through which it has passed, and the function of the detection assembly 12 is to detect this intensity distribution.

Figure 2:
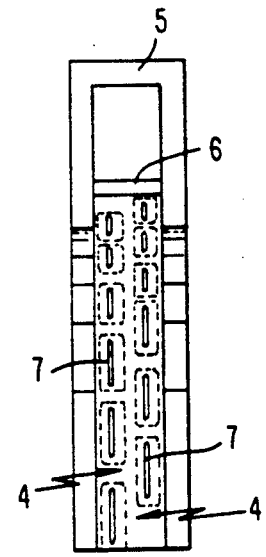
FIG. 2 is a side view of the FIG. 1 system seen looking along arrow II in FIG. 1.

As shown in FIG. 2, the detectors are disposed in an overlapping configuration so that every part of an object 10 irradiated by the excitation beam 3 is observed by at least one detector.

In addition to the items described above, each detector 4 is provided with a valve (not shown) for admitting gas, and also with sealed feedthroughs (also not shown) for conveying an external electrical potential $+V$ to the detection assembly 12 and for conveying the electrical signals produced by the assembly out from the enclosure, which signals are representative of the particle intensity distribution in the sheet flux, and thus of the nature and the thickness of the material through which the flux has travelled, said signals being conveyed by conductors 16.

FIG. 4 is a diagram showing the detection assembly 12 in greater detail.

Such an assembly comprises a solid converter, charge amplification means, and charge collecting means.

The converter is in the form of a plane plate 17 disposed at a grazing incidence relative to the flux 14, with the angle of incidence being non-zero, but being less than 10° for example, and preferably being about 1°. When using X-rays, this converter is constituted, for example, by a plate of tantalum having a thickness lying in the range 50 microns to 200 microns.

The function of the converter is to produce ionizing particles inside the enclosure under the impact of the neutral particles it receives from the flux 14. The trajectory of an ionizing particle is shown symbolically in FIG. 4 by a dot-dashed line T1.

The charge amplification means comprise, for example, electrically conductive lines 18 preferably constituted in the form of very fine wires connected to an external potential source which maintains them at a positive potential $+V$, which potential is about 3000 volts, for example. The wires 18 may be made of stainless steel or of gold-plated tungsten, for example. They are 50 microns in diameter and they are disposed more or less parallel to one another and about 2.5 millimeters apart from one another in a plane which is more or less parallel to the converter and which is at a distance of about 2 millimeters therefrom. They also extend generally transversely relative to the mean direction of propagation 15 of the neutral particles.

The ionizing particles such as the particle propagating along T1 give rise to electrical charges taken from the gas molecules contained in the enclosure 11, and more precisely they give rise to negatively charged electrons and to positive ions.

The electrons are strongly attracted towards the electrical lines connected to the positive electric potential $+V$ and they in turn give rise to electrical charges, e.g. by the avalanche effect, with all of the negative charges being attracted to the lines 18. This phenomenon of negative charges being attracted by the lines 18 is represented symbolically in FIG. 4 by solid line arrows such as T2.

In addition to the converter and the charge amplification means described above, each detection assembly 12 in accordance with the invention also includes charge collecting means.

Although the term "charge collecting means" could a priori be applied to the lines 18 which collect negative charges, this term is used herein to designate items which are distinct from these lines.

In particular, the charge collecting means comprise tracks 19 connected to the above-mentioned conductors 16, or constituted by said conductors.

The tracks 19 are constituted by electrical conductors connected to an electrical potential close to the potential of the converter, in other words a potential which is negative relative to the potential $+V$ of the lines 18. Although they are at the same potential or at similar potentials, the tracks 19 are electrically insulated from one another and also from the converter. Although the converter could be electrically isolated so as to adopt an electrically floating potential, it is preferable for the converter to be connected to ground potential with the tracks 19 being also connected to ground potential but via capacitors such as 25.

Under these conditions, although the tracks do not behave identically to the lines 18 which are solely responsible for charge amplification, they nevertheless act symmetrically thereto with respect to charge collection, and more precisely they act as cathodes. The positive ions created by the avalanche phenomena are attracted by the negative potential relative thereto of the tracks 19 and they are collected by the tracks. This phenomenon is represented symbolically in FIG. 4 by dashed line arrows such as T3.

The tracks 19 are disposed, for example, at least more or less parallel to one another and they lie in a plane which is more or less parallel to the converter. In the embodiment shown in FIGS. 4 and 5, these tracks are disposed in the immediate proximity of each face of the converter at a distance of about 15 microns therefrom, for example. They extend generally parallel to the projection on the converter 17 of the mean propagation direction 15 of the neutral particles. Finally, these tracks are spaced apart from one another in a direction which is substantially perpendicular to said projection, and at a spacing which may be substantially smaller than the spacing between adjacent lines 18, and may even be less than a millimeter, for example.

Each track 19 is connected via a conductor 16 passing through the enclosure 11 to an electronic device 20 symbolized as an amplifier and suitable for further amplifying and measuring the total charge received by the track to which it is connected.

Each track 19 may be individually connected to an electronic device 20 specific to said track, or the tracks 19 may be multiplexed in conventional manner so as to be connected in turn to a single electronic device 20 which then measures the charge received by each of the tracks sequentially.

Electronic devices such as 20 are well known to the person skilled in the art and further description would be superfluous. Their function consists in making it possible to obtain a visible display on a screen and preferably also to obtain storage in a suitable electronic memory, representative of the set of electrical signals corresponding to the charges received by the various tracks 19, said charges themselves being representative of the nature and the thickness of the material passed through by the neutral particles which reach various different locations of the converter 17 along the direction of the lines 18.

Instead of disposing the tracks 19 so as to be exactly parallel to one another, it is both possible and advantageous, in accordance with the invention, to dispose each of the lines 19 so that it points towards the source 1. Although this disposition causes two adjacent tracks to depart from exact parallelism by a very small angle only, e.g. one tenth of a degree, it makes it possible to move the detector 4 and the source 1 closer together without parallax errors appearing and it also makes it possible for the detector to receive a larger quantity of neutral particles from a given source 1 than it would otherwise receive if the distance between the detector and the source were greater.

The detector assembly 12 may be made as shown in FIG. 5.

The detector assembly 12 comprises a stack which is substantially symmetrical about its middle layer constituted by the converter 17. Functionally equivalent items situated above and below the converter in the disposition shown in FIG. 5 are given the same reference numerals and are distinguished by the letters "s" (for superior=upper) and "i" (for inferior=lower).

A sheet 21s or 21i of insulating material, e.g. a sheet of material sold under the trademark Kapton, is hot glued in a press and by means of an appropriate polymerizable glue onto each of the faces of the converter 17. These sheets are 12 microns thick, with the outer face of each sheet being initially covered in conventional manner with a layer of copper having a thickness of 5 microns.

After the sheets have been glued onto the converter, each layer of copper is etched by photolithography so as to leave rectilinear tracks constituting the tracks 19. For reasons of clarity, only a small number (4) of highly convergent tracks are shown in FIG. 5 whereas there are preferably many tracks (e.g. 256) which converge, in practice, very much less, with the amount of convergence depending on the distance between the detector and the source.

Facing conductors such as 16s and 16i are connected together to the same electronic device 20.

Over each plane of track 19 there is a spacer frame such as 22s or 22i. Each of these frames is rectangular in shape like the converter 17 and performs two functions: firstly it supports the converter in such a manner as to enable it to remain as plane as possible, and secondly it determines the spacing in the vertical direction in FIG. 5 between the plane of the tracks 19 and the more distant layers of the detector.

Each frame 22s, 22i is about 1.5 millimeters thick, for example and may be made either of glass fiber reinforced epoxy resin or else of stainless steel.

However, if stainless steel is used, then the tracks 19 and the frames 22s and 22i are separated by insulation in order to avoid short-circuiting the various tracks via the frames. In addition, the front edge of the lower frame 22i is made of a material which is highly transparent to neutral particles so as to avoid casting a shadow on the converter.

Above each of the frames 22s, 22i, there is a support plane 23s or 23i likewise in the form of a rectangular frame and made, for example, of glass fiber reinforced epoxy resin. The wires 18 are stretched over those faces of each of these supports which face away from the adjacent frame 22s and 22i, and the wires are electrically connected to one another and to the source of potential +V outside the enclosure 11.

An additional plane cathode 24s or 24i is disposed over each support 23s or 23i and is electrically insulated from the wires 18, e.g. by means of appropriate insulating studs such as 24p, and each cathode is taken to substantially the same potential as the converter 17. Although such cathodes are optional, they serve to establish a symmetrical electric field around the wires 18 and thereby contribute to improving the performance of the apparatus.

An insulating plate 26 may be disposed over the top additional cathode 24s in order to insulate the cathode 24s from the bracket 13 to which it is fixed. Insofar as the potentials of the cathode and of the bracket can be selected to be equal to each other and to ground potential, for example, the plate 26 is optional.

The stack constituted by the various layers shown in FIG. 5 may be fixed to the bracket 13 by means of nylon screws, for example, thereby avoiding any transmission of electrical potential from one layer to another.

Although the embodiment described with reference to FIG. 5 refers to a symmetrical assembly, the person skilled in the art will understand that a detector in accordance with this embodiment could be constructed while omitting all of the elements that appear either below or above the converter 17 in FIG. 5.

Figure 6:
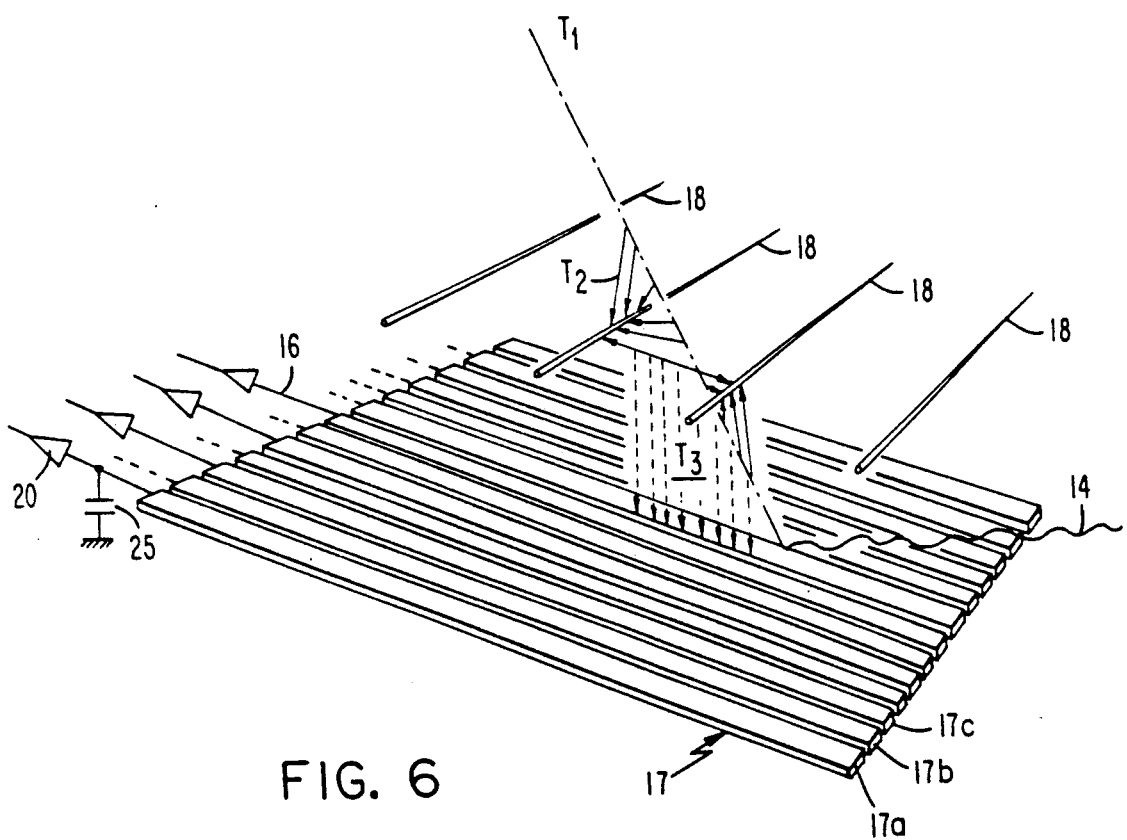
FIG. 6 is a theoretical diagram similar to that of FIG. 4 showing the operation of a second embodiment of the FIG. 3 apparatus.

FIG. 6 is a diagram of another embodiment of the invention in which the converter 17 is constituted by coplanar elements such as 17a, 17b, and 17c obtained, for example, by cutting up a plate of tantalum and together acting not only as the converter, but also as a set of collecting tracks 19 as described with reference to FIG. 4.

The coplanar elements such as 17a, 17b, and 17c thus occupy the same disposition as that described for the tracks 19 in FIGS. 4 and 5, they are electrically insulated from each other, each of them is individually connected to ground potential via a respective capacitor such as 25, and each of them is connected either individually or in turn via multiplexing means to at least one electronic circuit such as 20.

In another variant embodiment of the invention, at least one of the additional cathodes such as 24s may be constituted by a plane of charge collecting tracks 19 either instead of or in addition to the charge collecting tracks disposed in the immediate proximity of the converter or directly constituted by the converter.

We claim:

1. Apparatus for detecting and localizing particles in a flux of neutral particles emitted by a source and propagating within a solid angle of limited aperture defined about a mean direction (15), the apparatus comprising:
   a substantially plane solid converter (17) for disposing at grazing incidence relative to said mean direction, said converter being suitable for producing electrical charges under the impact of said neutral particles;

charge amplification means for raising the charges to an electrical potential different from that of the converter and for amplifying the charges by stimulated ionization of a surrounding gas;

charge collecting means comprising elongate charge collecting conductors (19) which are electrically insulated from one another, which are substantially parallel to one another and to the converter, and each of which forms, together with the mean direction of said flux, a plane substantially perpendicular to the converter; and an enclosure (11) which is permeable to the neutral particles and which contains the converter, the charge amplification means, the charge collecting means, and the gas;

the apparatus being characterized in that said charge amplification means comprise electrically conductive lines (18) which are distinct from said charge collecting conductors, and in that the charge collecting conductors (19) comprising means for connecting to an electrical potential close to that of the converter.

2. Apparatus according to claim 1, characterized in that the charge collecting conductors are disposed in the immediate proximity of at least one of the faces of the converter and are separated therefrom by a layer (21) of insulating material.

3. Apparatus according to claim 1, characterized in that said converter is built up from coplanar elements which constitute said charge collecting conductors.

4. Apparatus according to claim 3, characterized in that said electrically conductive lines are disposed in at least one plane substantially parallel to the plane of the converter each extending substantially transversely relative to the direction in which the charge collecting conductors extend.

5. Apparatus according to claim 2, characterized in that the charge collecting conductors converge towards the source of neutral particles.

6. Apparatus according to claim 5, characterized in that the insulating material comprises a polymer sheet and in that said charge collecting conductors are constituted by copper tracks etched on said polymer sheet.

7. A method of detecting and localizing particles in a flux of neutral particles emitted by a source and propagating within a solid angle of limited aperture defined about a mean direction, the method comprising the following steps:

receiving said particles on a substantially plane solid converter (17) disposed at grazing incidence relative to the mean direction of the flux of particles, thereby producing electrical charges from said neutral particles;

amplifying said charges by stimulated ionization of a surrounding gas; and collecting the charges present in at least one plane substantially parallel to the converter at various locations spaced apart along a direction substantially parallel to the mean direction (15) of the flux of particles;

the method being characterized in that the operation of collecting the charges consists in collecting charges of polarity opposite to the polarity of the charges which are amplified by ionization.

8. A method according to claim 7, characterized in that the charges are collected along charge collecting tracks (19) which are spaced apart from one another along a direction which is substantially perpendicular to the mean direction of the flux of particles.

9. A method according to claim 7, characterized in that the charges are collected along charge collecting tracks which converge towards the source of neutral particles.

10. A method according to claim 7, characterized in that charge amplification comprises establishing at least one electrical potential (+V) different from that of the converter along a plurality of lines in a plane parallel to the converter.

11. A method according to claim 10, characterized in that said lines (18) at the established electrical potential extend substantially transversely relative to the direction in which said charge collecting tracks (19) extend.

12. Apparatus according to claim 1, characterized in that said electrically conductive lines are disposed in at least one plane substantially parallel to the plane of the converter each extending substantially transversely relative to the direction in which the charge collecting conductors extend.

13. Apparatus according to claim 2, characterized in that said electrically conductive lines are disposed in at least one plane substantially parallel to the plane of the converter each extending substantially transversely relative to the direction in which the charge collecting conductors extend.

14. Apparatus according to claim 1, characterized in that the charge collecting conductors converge towards the source of neutral particles.

15. Apparatus according to claim 2, characterized in that the charge collecting conductors converge towards the source of neutral particles.

16. Apparatus according to claim 3, characterized in that the charge collecting conductors converge towards the source of neutral particles.

17. Apparatus according to claim 2, characterized in that the insulating material comprises a polymer sheet and in that said charge collecting conductors are constituted by copper tracks etched on said polymer sheet.

18. Apparatus according to claim 2, characterized in that the insulating material comprises a polymer sheet and in that said charge collecting conductors are constituted by copper tracks etched on said polymer sheet.

19. Apparatus according to claim 4, characterized in that the insulating material comprises a polymer sheet and in that said charge collecting conductors are constituted by copper tracks etched on said polymer sheet.

20. A method according to claim 8, characterized in that the charges are collected along charge collecting tracks which converge towards the source of neutral particles.

21. A method according to claim 7, characterized in that charge amplification comprises establishing at least one electrical potential (+V) different from that of the converter along a plurality of lines in a plane parallel to the converter.

22. A method according to claim 8, characterized in that said lines at said established electrical potential extend substantially transversely relative to the direction in which said charge collecting tracks extend.

23. A method according to claim 9, characterized in that the amplifying step comprises establishing at least one electrical potential (+V) different from that of the converter along a plurality of lines in a plane parallel to the converter.

24. A method according to claim 23, characterized in that said lines at said established electrical potential extend substantially transversely relative to the direction in which said charge collecting tracks extend.

* * * * *